United States Patent
Patwardhan et al.

(10) Patent No.: US 8,942,698 B2
(45) Date of Patent: Jan. 27, 2015

(54) METHODS AND DEVICES FOR FACILITATING ACCESS TERMINAL REGISTRATION WITH A REGISTRATION SERVER

(75) Inventors: Ravindra Manohar Patwardhan, San Diego, CA (US); Rashid Ahmed Akbar Attar, San Diego, CA (US); Christopher Gerard Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 13/614,916

(22) Filed: Sep. 13, 2012

(65) Prior Publication Data
US 2013/0252609 A1    Sep. 26, 2013

Related U.S. Application Data

(60) Provisional application No. 61/554,835, filed on Nov. 2, 2011.

(51) Int. Cl.
*H04W 60/00* (2009.01)
*H04W 4/00* (2009.01)
(Continued)

(52) U.S. Cl.
CPC .............. *H04W 60/00* (2013.01); *H04W 4/005* (2013.01); *H04W 60/02* (2013.01); *H04W 52/0264* (2013.01); *H04L 63/0884* (2013.01); *H04L 69/28* (2013.01); *H04W 88/182* (2013.01)
USPC .......................... 455/435.1; 455/458; 455/574

(58) Field of Classification Search
USPC ......... 455/414.1, 435.1–435.3, 458, 572–574
See application file for complete search history.

(56) References Cited

U.S. PATENT DOCUMENTS 8,233,900 B2 * 7/2012 Wu .............................. 455/435.1
8,521,170 B2 * 8/2013 Buckley et al. ................ 455/445
(Continued)

FOREIGN PATENT DOCUMENTS

WO    2009000316 A1    12/2008
WO    2011066409 A1    6/2011
(Continued)

OTHER PUBLICATIONS

Chao Hua et al., "Power saving for Machine to Machine communications in cellular networks", Globecom Workshops (GC WKSHPS), 2011, Dec. 5, 2011, pp. 389-393, IEEE, XP032124615, DOI: 10.1109/GLOCOMW.2011.6162477, ISBN: 978-1-4673-0039-1.
(Continued)

*Primary Examiner* — Kashif Siddiqui

(57) ABSTRACT

Access terminals are adapted to communicate with registration servers to enable a registration server to perform timer-based registrations on behalf of an access terminal. The access terminal can cease performing such timer-based registrations as long as the registration server performs the registrations, and may power down until event data is available for transmission or reception. When a registration server performs timer-based registrations on behalf of an access terminal, the registration server can periodically communicate with a network entity to conduct the timer-based registrations for the access terminal. The network entity can receive a timer-based registration message from a registrations server for registering an access terminal. In response to such a message, the network entity can register the access terminal. Sensors and controllers may be used with some embodiments to collect and analyze data and for potentially taking action. Other aspects, embodiments, and features are also claimed and described.

16 Claims, 10 Drawing Sheets

(51) Int. Cl.
*H04W 60/02* (2009.01)
*H04W 52/02* (2009.01)
*H04L 29/06* (2006.01)
*H04W 88/18* (2009.01)

(56) References Cited

U.S. PATENT DOCUMENTS

| | | |
|---|---|---|
| 2011/0140846 A1 | 6/2011 | Blanz et al. |
| 2011/0252235 A1 | 10/2011 | Dolan et al. |
| 2011/0256891 A1 | 10/2011 | Soliman et al. |
| 2011/0307694 A1 | 12/2011 | Broustis et al. |
| 2012/0004003 A1 | 1/2012 | Shaheen et al. |

FOREIGN PATENT DOCUMENTS

| | | |
|---|---|---|
| WO | 2011087826 A1 | 7/2011 |
| WO | 2011112683 A1 | 9/2011 |
| WO | 2012137033 A1 | 10/2012 |

OTHER PUBLICATIONS

International Search Report and Written Opinion—PCT/US2012/063362—ISA/EPO—Feb. 8, 2013.

\* cited by examiner

METHODS AND DEVICES FOR FACILITATING ACCESS TERMINAL REGISTRATION WITH A REGISTRATION SERVER

CROSS-REFERENCE TO RELATED APPLICATION & PRIORITY CLAIM

The present Application for Patent claims priority to Provisional Application No. 61/554,835 entitled "METHODS AND DEVICES FOR FACILITATING ACCESS TERMINAL REGISTRATION USING A REGISTRATION SERVER," filed Nov. 2, 2011, and assigned to the assignee hereof, hereby expressly incorporated by reference herein as if fully set forth below and for all applicable purposes.

TECHNICAL FIELD

Embodiments of the present invention relate generally to wireless communication, and more specifically, to methods and devices for facilitating access terminal registration with a registration server.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

A variety of devices are adapted to utilize such wireless communications systems. Such devices may be generally referred to as access terminals. Some access terminals may be stationary, or at least substantially stationary, such as access terminals adapted for machine-to-machine (M2M) communications (also sometimes referred to as machine-type communication or MTC). An M2M adapted access terminal may include an access terminal that is adapted to operate at least substantially without user interaction. Such M2M adapted access terminals may operate on a limited power source, such as a battery. Accordingly, features may be desirable to conserve power and improve the life of such power sources.

BRIEF SUMMARY OF SOME EMBODIMENTS

Various examples and implementations of the present disclosure facilitate access terminal registrations with a registration server performing the registrations on behalf of one or more access terminals. According to at least one aspect of the present disclosure, access terminals are provided, which are adapted to employ a registration server for performing registrations on behalf of the access terminal. One or more examples of such access terminals may include a communications interface and a storage medium coupled with a processing circuit. The processing circuit may be adapted to communicate with a registration server via the communications interface to enable the registration server to perform timer-based registrations on behalf of the access terminal using an identity (ID) associated with the access terminal. The processing circuit may stop performing timer-based registrations while the registration server performs the timer-based registrations on behalf of the access terminal, and may power down until event data is available for transmission or reception.

Further aspects provide methods operational on an access terminals and/or access terminals including means to perform such methods. One or more examples of such methods may include communicating with a registration server to enable the registration server to perform timer-based registrations on behalf of the access terminal using the access terminal's ID. Conducting timer-based registrations is stopped while the registration server is performing the timer-based registrations on behalf of the access terminal. The access terminal may power down until event data is available for transmission or reception.

Still further aspects include processor-readable mediums comprising instructions operational on an access terminal. According to one or more examples, such instructions may cause a processor to communicate with a registration server to enable the registration server to perform timer-based registrations on behalf of the access terminal using an identity (ID) associated with the access terminal. The instructions may further cause the processor to cease conducting timer-based registrations while the registration server performs the timer-based registrations on behalf of the access terminal. The instructions may also cause the processor to power down until event data is available for transmission or reception.

One or more additional aspects of the present disclosure provide registration servers adapted to perform timer-based registrations on behalf of one or more access terminals. According to at least one example, a registration server may include a communications interface and a storage medium coupled with a processing circuit. The processing circuit may be adapted to communicate with an access terminal via the communications interface to enable the registration server to perform timer-based registrations on behalf of the access terminal. The processing circuit may further be adapted to periodically communicate with a network entity to conduct the timer-based registrations for the access terminal using an identity (ID) associated with the access terminal Additional aspects provide methods operational on a registration server and/or registration servers including means to perform such methods. According to at least one example, such a method may include communicating with an access terminal to enable the registration server to perform timer-based registrations on behalf of the access terminal. Communications with a network entity may be periodically employed to conduct the timer-based registrations for the access terminal using an identity (ID) associated with the access terminal.

Still further aspects include processor-readable mediums comprising instructions operational on a registration server. According to one or more examples, such instructions may cause a processor to communicate with an access terminal to enable the registration server to perform timer-based registrations on behalf of the access terminal. The instructions may further cause the processor to periodically communicate with a network entity to conduct the timer-based registrations for the access terminal using an identity (ID) associated with the access terminal At least one additional aspect of the present disclosure provides network entities adapted to perform timer-based registrations for one or more access terminals in response to communications from a registration server. In one or more examples, a network entity may include a communications interface and a storage medium coupled with a processing circuit. The processing circuit may be adapted to receive a timer-based registration message from a registration server, where the timer-based registration message is adapted for registering an access terminal. The processing circuit may further be adapted to register the access terminal based on the timer-based registration message received from the registration server.

Further aspects provide methods operational on a network entity and/or network entities including means to perform such methods. According to at least one example, such methods may include receiving a timer-based registration message from a registration server, where the timer-based registration message is adapted for registering an access terminal. The access terminal may be registered based on the timer-based registration message received from the registration server.

Additional aspects include processor-readable mediums comprising instructions operational on a network entity. According to one or more examples, such instructions may cause a processor to receive a timer-based registration message from a registration server, where the timer-based registration message is adapted for registering an access terminal, and register the access terminal based on the received timer-based registration message.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
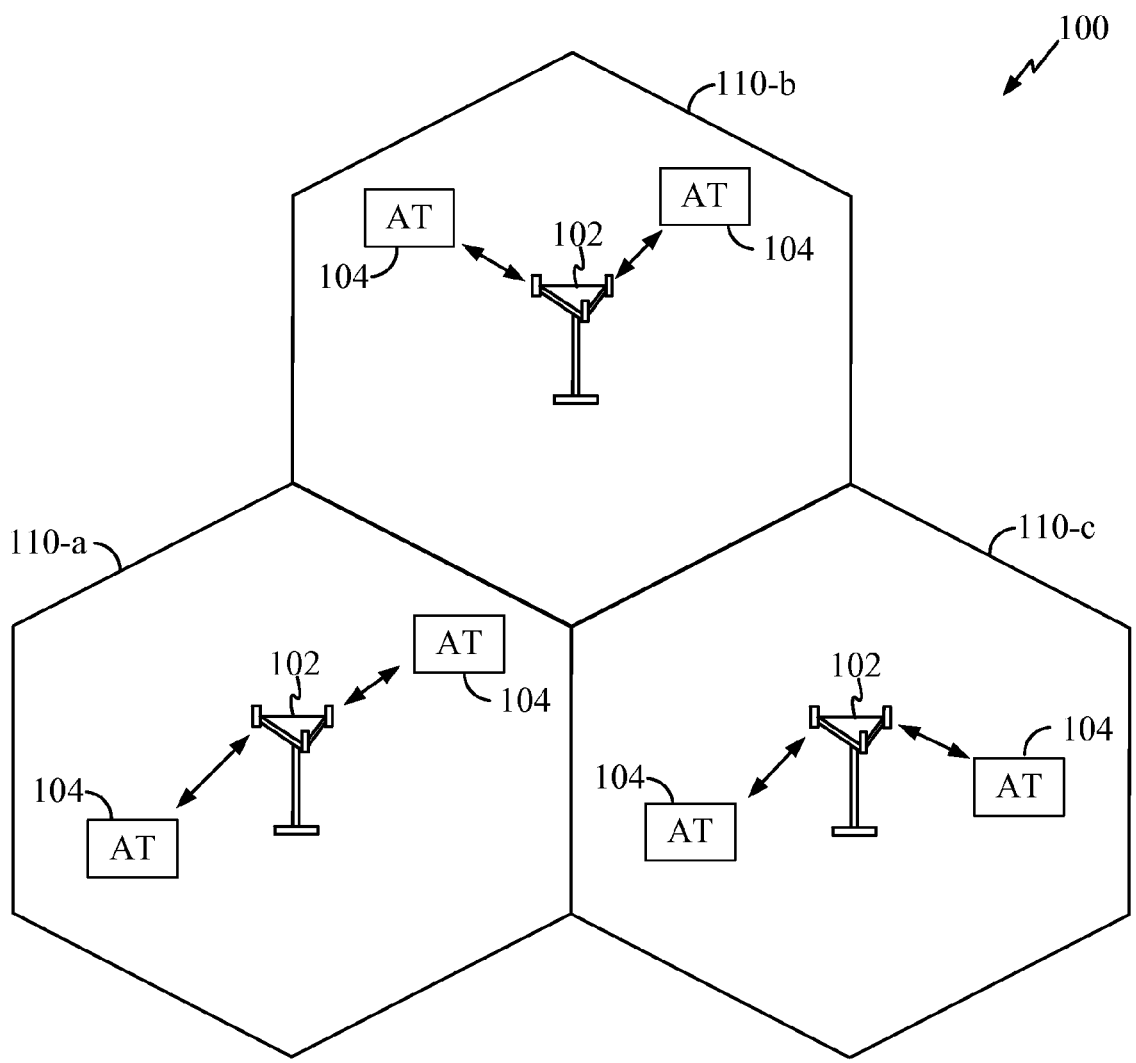
FIG. 1 is a block diagram illustrating an example of a wireless communications system according to some embodiments of the present invention.

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form in order to avoid obscuring the described concepts and features.

The word "exemplary" may be used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation. The terms "base station" and "access terminal" as used herein are meant to be interpreted broadly. For example, a "base station" may refer to a device that facilitates wireless connectivity (for one or more access terminals) to a communication or data network. Such "base stations" may also be referred to by those skilled in the art as an access point, a base transceiver stations (BTS), a radio base station, a radio transceiver, a transceiver function, a basic service set (BSS), an extended service set (ESS), a Node B, a femto cell, a pico cell, access point, or some other suitable terminology.

Furthermore, an "access terminal" refers generally to one or more devices that communicate with one or more other devices through wireless signals. Such access terminals may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Access terminals may include mobile terminals and/or at least substantially fixed terminals. Examples of access terminals include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) enabled devices, and/or other communication/computing devices which communicate, at least partially, through a wireless or cellular network.

Certain aspects of the disclosure are described below for CDMA and 3rd Generation Partnership Project 2 (3GPP2) 1× protocols and systems, and related terminology may be found in much of the following description. However, those of ordinary skill in the art will recognize that one or more aspects of the present disclosure may be employed and included in one or more other wireless communication protocols and systems.

FIG. 1 is a block diagram illustrating an example of a wireless communications system 100. The system 100 includes base stations 102 adapted to communicate wirelessly with one or more access terminals 104. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 may wirelessly communicate with the access terminals 104 via a base station antenna. The base stations 102 are configured to communicate with the access terminals 104 under the control of a base station controller (see FIG. 2) via multiple carriers. Each of the base station 102 sites can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). The system 100 may include base stations 102 of different types (e.g., macro, micro, and/or pico base stations).

Figure 2:
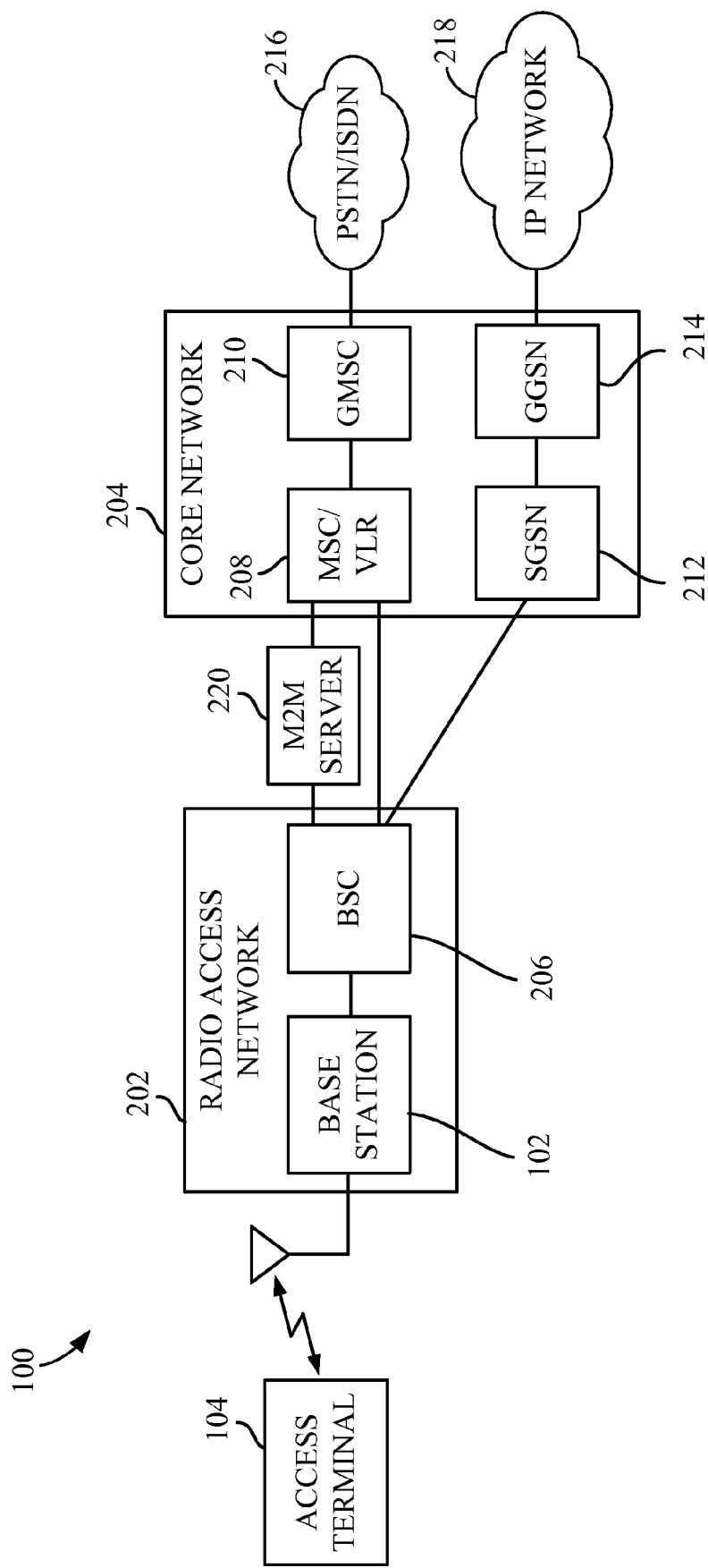
FIG. 2 is a block diagram illustrating select components of the wireless communications system depicted in FIG. 1, according to at least one example embodiment of the present invention.

The access terminals 104 may be dispersed throughout the coverage areas 110. Each access terminal 104 may communicate with one or more base station 102. FIG. 2 is a block diagram illustrating select components of the wireless communication system 100 according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may also be referred to by those skill in the art as a base station subsystem (BSS), an access network, a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as a EIR, HLR, VLR and AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

As an access terminal 104 operates within the wireless communications system 100, the access terminal 104 will perform various registrations with the system 100. For instance, when an access terminal 104 initially powers on and connects to the system 100, a power-up registration may be performed. After an access terminal 104 is initially connected to the system 100, and has completed authentication procedures, the access terminal 104 may perform periodic timer-based registrations with the system 100. Timer-based registrations, which are different from power-up registrations and authentication procedures, are typically conducted by sending wireless transmissions from the access terminal 104 via the radio access network 202 to the MSC/VLR 208 to indicate to the MSC/VLR 208 that the access terminal 104 is still present within the network associated with the MSC/VLR 208.

Timer-base registrations are often performed during a registration period indicated by the system 100. For instance, a registration period may be broadcast via the base station 102, during which time each access terminal 104 within the coverage area for the particular base station 102 can register with the network. If an access terminal 104 fails to register with the network according to the periodic schedule, the network will drop the access terminal 104 from its database and the network will no longer consider the access terminal 104 to be actively located within the network. When an access terminal 104 is not active on the wireless network (e.g., no traffic channel setup, or other forms of registration), the idle access terminal 104 performs registration each registration period. Typically, the registration period can be a relatively short interval (e.g., between 15 minutes and 1 hour) in order for the system 100 to track the locations of the various access terminals 104 and avoid page failures.

In some instances, one or more of the access terminals 104 may be stationary or substantially stationary such that timer-based registrations for tracking locations of these access terminals 104 serve less of a purpose, since the location for transmitting pages rarely if ever changes. One example of such stationary or substantially stationary access terminals 104 includes machine-to-machine (M2M) enabled access terminals 104. M2M enabled access terminals 104 are adapted to wirelessly communicate with one or more devices over the wireless communication system 100, at least substantially without user interaction. M2M access terminals 104 may comprise a communications device adapted to capture an event (e.g., a sensor that captures temperature, a meter to capture inventory level, etc.), which is relayed through the wireless communication system 100 to an application (e.g., software program), where the event data can be translated into meaningful information (e.g., temperature needs to be lowered/raised, items need to be restocked, etc.). In some embodiments, the access terminals may include a sensor coupled to a controller/actuator. The controller/actuator can be configured to receive data and/or instructions (e.g., network or control data) and implement an action (e.g., activating a sprinkler, temperature modification device, or alarm condition).

M2M enabled access terminals 104 may be adapted to send/receive data relatively infrequently. For example, an M2M enabled access terminal 104 may be adapted to send/receive data anywhere from every few hours to once a month, or even longer. In such cases, the timer-based registration periods described above may be burdensome on the M2M enabled access terminals 104. That is, because conventional timer-based registration periods may be relatively short (e.g., on the order of every 15-60 minutes, although some may be less or more frequent), access terminals such as the M2M access terminals may consume substantial battery power in order to register during each registration period.

According to at least one aspect of the present disclosure, the wireless communications system 100 further includes a registration server adapted to perform timer-based registrations on behalf of one or more access terminals 104. As depicted in FIG. 2, such a registration server may be employed as a machine-to-machine (M2M) server 220. Although the present disclosure refers to the registration server as an M2M server, it should be understood that the M2M servers described herein are not the only implementation for a registration server. Accordingly, use of the term 'M2M server" in this disclosure should be understood to refer generally to any registration server adapted to perform timer-based registrations on behalf of one or more access terminals.

The M2M server 220 may be generally adapted to communicate with one or more access terminals 104 and one or more network entities. The M2M server 220 may communicate with an access terminal 104 and/or with a network entity through a direct link (wired and/or wireless) and/or through a relayed link (wired and/or wireless) by means of a communication network. In the example depicted in FIG. 2, the M2M server 220 is communicatively coupled with the base station controller 206 and the MSC/VLR 208. According to this example, the M2M server 220 can communicate with the access terminal 104 through a relayed link (e.g., a wireless link between the access terminal 104 and the base station 102, a wired link between the base station 102 and the base station controller 206, and a wired link between the base station controller 206 and the M2M server 220). Furthermore, in the depicted example, the M2M server 220 can communicate with the MSC/VLR 208 through a direct link (e.g., a wired link, such as an IP network link, between the M2M server 220 and the MSC/VLR 208). The M2M server 220 may be included in the system 100 as a network entity, which may, in at least some examples, be incorporated into the core network 204. That is, the M2M server 220 may be implemented as a network entity in the core network 204.

Figure 3:
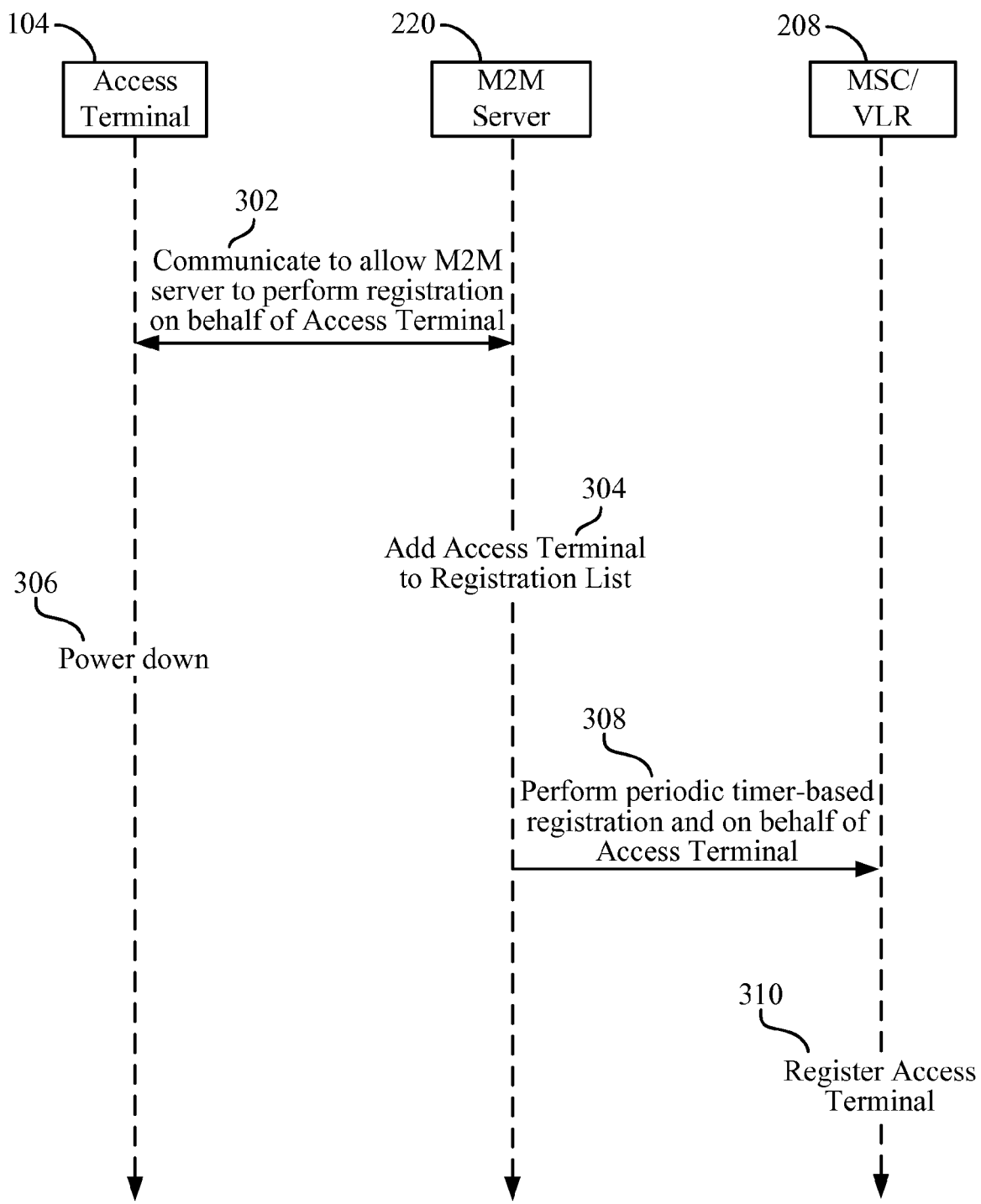
FIG. 3 is a flow diagram illustrating an example of facilitating timer-based registrations with a registration server acting on behalf of an access terminal according to some embodiments of the present invention.

FIG. 3 is a flow diagram illustrating an example of facilitating timer-based registrations with a registration server acting on behalf of an access terminal. The registration server is depicted as the M2M server 220 for illustration purposes. Initially, an access terminal 104 may communicate 302 with the M2M server 220 for enabling the M2M server 220 to perform timer-based registrations on behalf of the access terminal 104. In some instances, the communication 302 may include a request sent from the access terminal 104 to the M2M server 220, asking the M2M server 220 to perform registration on behalf of the access terminal 104. In other instances, the M2M server 220 may send a request to the access terminal 104 to perform the timer-based registrations on behalf of the access terminal 104.

In order to conduct timer-based registrations on behalf of the access terminal 104, the M2M server 220 may employ information about the access terminal 104 relevant to such registrations. Accordingly, the M2M server 220 may obtain such relevant information about the access terminal 104, such as the access terminal ID (e.g., IMSI, TMSI), whether the access terminal 104 is stationary, the frequency of expected data exchanges with the access terminal 104, etc. In some instances, the M2M server 220 may also have a keep-alive mechanism with the access terminal 104. In examples where the access terminal 104 sends the request for performing timer-based registrations to the M2M server, the request may include registration information associated with the access terminal 104 to enable the M2M server 220 to conduct registration on behalf of the access terminal 104. In examples where the M2M server 220 sends a request to the access terminal to perform the timer-based registrations on behalf of the access terminal 104, the request may include a request for the relevant registration information associated with the access terminal 104. If the access terminal 104 accepts the request from the M2M server 220, the access terminal 104 can send the registration information associated with the access terminal 104 to enable the M2M server 220 to perform registrations on behalf of the access terminal 104.

In still other examples, the M2M server 220 may obtain some or all of the relevant registration information from the network. That is, according to at least one feature of the present disclosure, the M2M server 220 may obtain at least some of the relevant registration information, such as the access terminal ID, from the network. For instance, the M2M server 220 may obtain at least some of the relevant registration information from the MSC/VLR 208 so that little or none of the relevant registration information is transmitted between the access terminal 104 and the M2M server 220. Because the M2M server 220 can be implemented as a network entity that may be controlled by the network operator, the M2M server 220 may already have the relevant registration information or may have access to the relevant registration information, without the need to transfer such information over a communication link. This can provide improved security by reducing the risks involved in providing such information over a communication link where sensitive information such as the access terminal ID may be subject to greater risk of theft by an unapproved entity.

The M2M server 220 may keep a list of access terminals for which it is performing timer-based registrations. Accordingly, the M2M server 220 may add the access terminal 104 to its registration list at 304. After the access terminal 104 and the M2M server 220 have agreed to allow the M2M server 220 to perform registrations on behalf of the access terminal 104, the access terminal 104 may power down 306 (e.g., idle, sleep) and may ignore future timer-based registration periods for refreshing its registration with the network entity (e.g., the MSC/VLR 208).

The M2M server 220 subsequently communicates with the MSC/VLR 208 to perform periodic timer-based registrations 308 on behalf of the access terminal 104. Typically, the MSC/VLR 208 of a network manages the registration of access terminals 104. Accordingly, the M2M server 220 may communicate directly with the MSC/VLR 208 to perform the timer-based registrations on behalf of the access terminal 104. In response to the timer-based registrations conducted by the M2M server 220, the MSC/VLR 208 can register 310 the access terminal 104.

Figure 4:
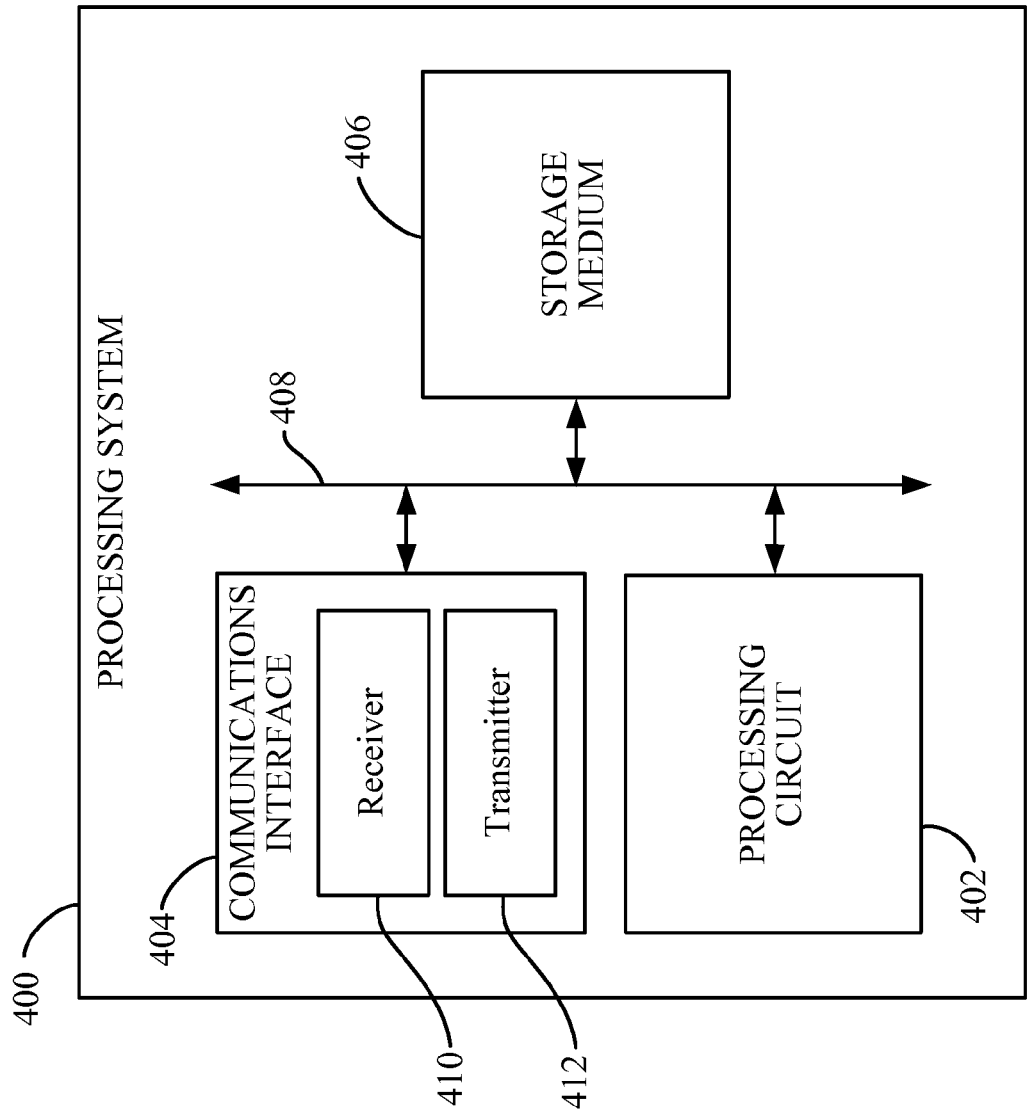
FIG. 4 is a block diagram illustrating select components of a processing system according to at least one example of the present invention.

The various features for timer-based registrations described herein may be implemented by one or more devices, which one or more devices may be generally implemented with one or more processing systems. FIG. 4 is a block diagram illustrating select components of a processing system 400 according to at least one example. The processing system 400 may generally include a processing circuit 402 coupled to a communications interface 404 and to a storage medium 406. In at least some examples, the processing circuit 402 may be coupled to the communications interface 404 and the storage medium 406 with a bus architecture, represented generally by the bus 408. The bus 408 may also link various other circuits such as timing sources, peripherals, voltage regulators, and power management circuits, which are well known in the art, and therefore, will not be described any further.

The processing circuit 402 is arranged to obtain, process and/or send data, control data access and storage, issue commands, and control other desired operations. The processing circuit 402 may include circuitry configured to implement desired programming provided by appropriate media in at least one embodiment. For example, the processing circuit 402 may be implemented as one or more processors, one or more controllers, and/or other structure configured to execute executable programming Examples of the processing circuit 402 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 402 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 402 are for illustration and other suitable configurations within the scope of the present disclosure are also contemplated.

The processing circuit 402 is adapted for processing, including the execution of programming, which may be stored on the storage medium 406. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 404 is configured to facilitate wired and/or wireless communications of the processing system 400. For example, the communications interface 404 may include circuitry and/or programming adapted to facilitate the communication of information bi-directionally with respect to one or more other processing systems. In instances where the communications interface 404 is configured to facilitate wireless communications, the communications interface 404 may be coupled to one or more antennas (not shown), and may includes wireless transceiver circuitry, including at least one receiver circuit 410 (e.g., one or more receiver chains) and/or at least one transmitter circuit 412 (e.g., one or more transmitter chains). The communications interface 404 may also include as a network interface card (NIC), a serial or parallel connection, a Universal Serial Bus (USB) interface, a Firewire interface, a Thunderbolt interface, or any other suitable arrangement for communicating with respect to public and/or private wired networks, as well as some combination thereof.

The storage medium 406 may represent one or more devices for storing programming and/or data, such as processor executable code or instructions (e.g., software, firmware), electronic data, databases, or other digital information. The storage medium 406 may also be used for storing data that is manipulated by the processing circuit 402 when executing programming The storage medium 406 may be any available media that can be accessed by a general purpose or special purpose processor. By way of example and not limitation, the storage medium 406 may include a non-transitory computer-readable medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other non-transitory computer-readable mediums for storing information, as well as any combination thereof.

The storage medium 406 may be coupled to the processing circuit 402 such that the processing circuit 402 can read information from, and write information to, the storage medium 406. That is, the storage medium 406 can be coupled to the processing circuit 402 so that the storage medium 406 is at least accessible by the processing circuit 402, including examples where the storage medium 406 is integral to the processing circuit 402 and/or examples where the storage medium 406 is separate from the processing circuit 402 (e.g., resident in the processing system 400, external to the processing system 400, distributed across multiple entities).

Programming stored by the storage medium 406, when executed by the processing circuit 402, causes the processing circuit 402 to perform one or more of the various functions and/or process steps described herein. Accordingly, any reference throughout the present disclosure to programming in relation to one or more features of the processing circuit 402 can include programming or operations stored by the storage medium 406. Thus, according to one or more aspects of the present disclosure, the processing circuit 402 may be adapted to perform any or all of the processes, functions, steps and/or routines for any or all of the various devices (e.g., access terminal 104, M2M server 220, MSC/VLR 208, etc.) described herein. As used herein, the term "adapted" in relation to the processing circuit 402 may refer to the processing circuit 402 being one or more of configured, employed, implemented, or programmed to perform a particular process, function, step and/or routine according to various features described herein.

Figure 5:
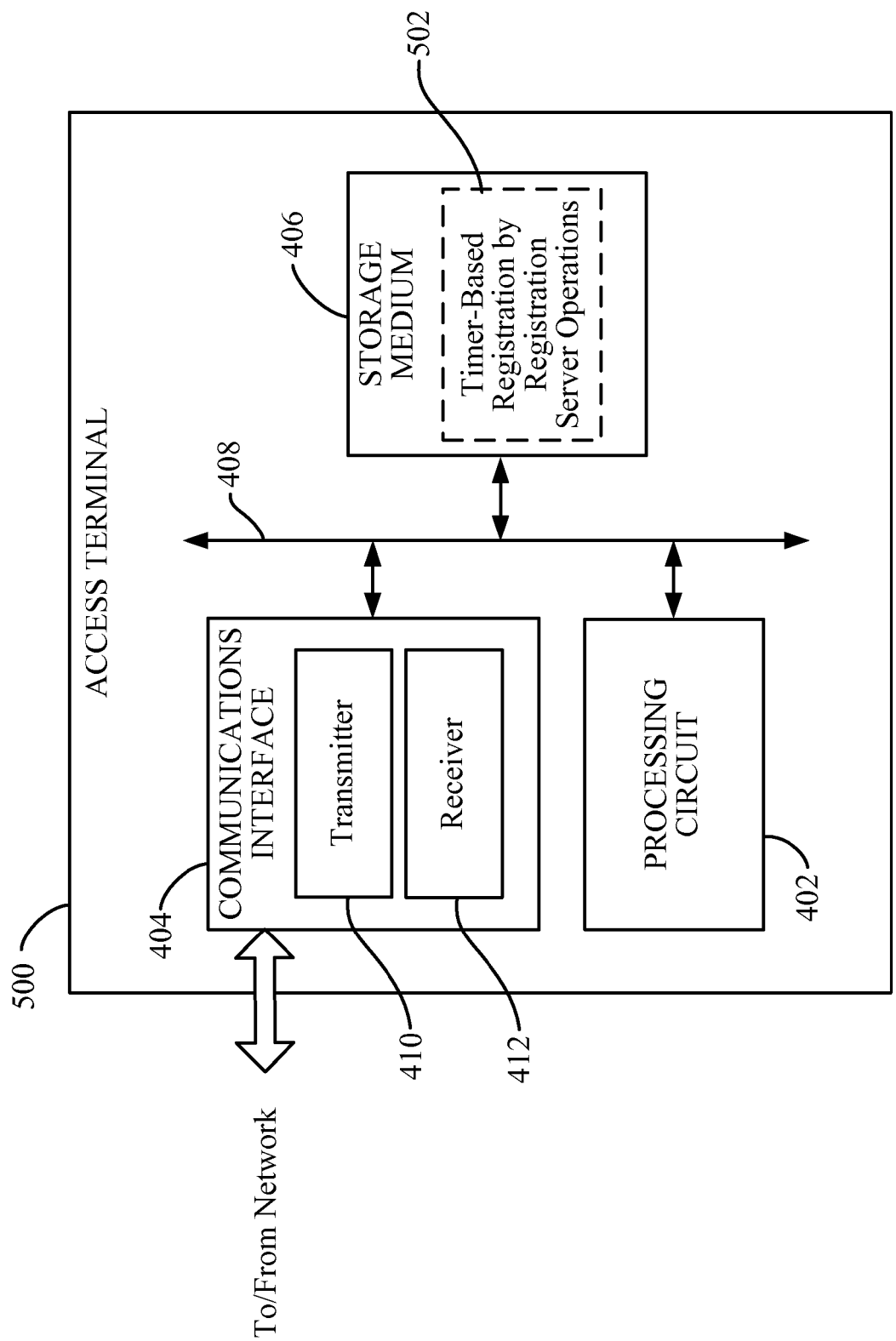
FIG. 5 is a block diagram illustrating select components of a processing system implemented as an access terminal according to at least one example of the present invention.

FIG. 5 is a block diagram illustrating select components of a processing system implemented as an access terminal 500 according to at least one example. The access terminal 500 includes the processing circuit 402 coupled to the communications interface 404 and to the storage medium 406. In this example, the processing circuit 402 is adapted to perform any or all of the processes, functions, steps and/or routines related to one or more of the access terminals 104 described herein. Accordingly, the storage medium 406 may include timer-based registration by registration server operations 502 for enabling a registration server (e.g., M2M server 220) to perform registrations on behalf of the access terminal 500. The timer-based registration by registration server operations 502 may include programming executable by the processing circuit 402 for communicating with a registration server, for stopping the access terminal 500 from registering as long as the registration server is performing such registrations, and for powering down the access terminal until event data is available for transmission or reception.

Figure 6:
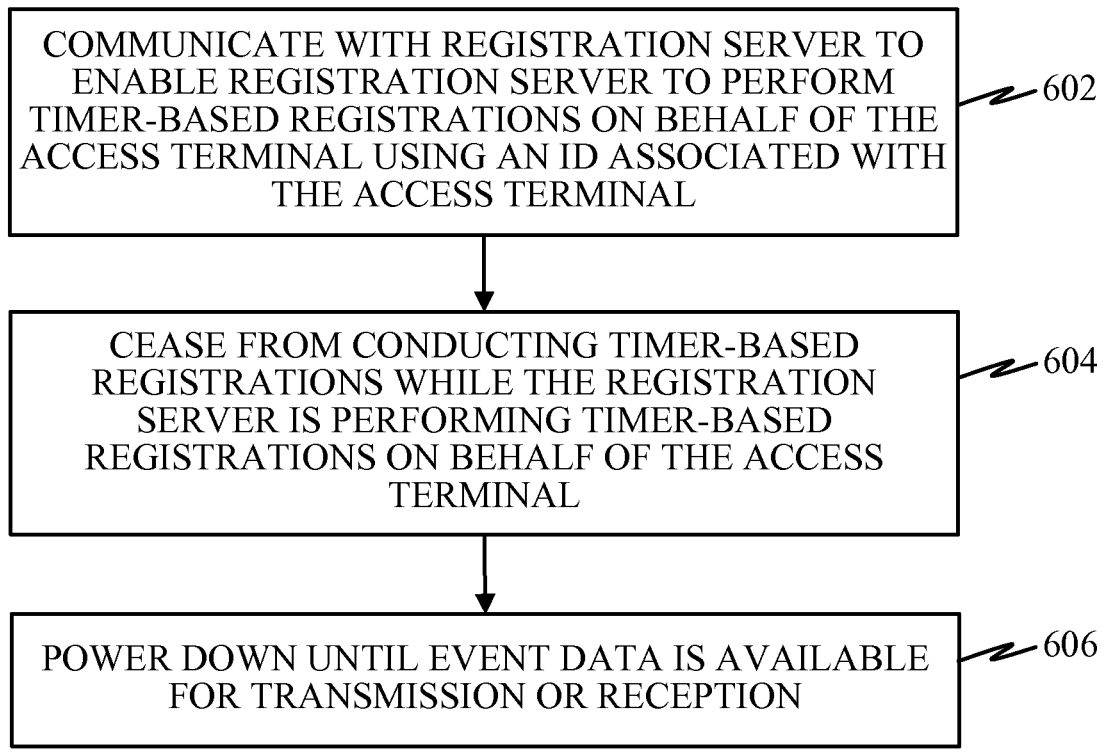
FIG. 6 is a flow diagram illustrating a method operational on an access terminal according to at least one example of the present invention.

FIG. 6 is a flow diagram illustrating a method operational on an access terminal, such as access terminal 500, according to at least one example. Referring to FIGS. 5 and 6, the access terminal 500 may communicate with a registration server to enable the registration server to perform timer-based registrations on behalf of the access terminal 500 using an identity (ID) associated with the access terminal 500 at step 602. For example, the processing circuit 402 executing the timer-based registration by registration server operations 502 may communicate with a registration server, such as the M2M server 220 via the communications interface 404.

In at least one example, the processing circuit 402 may send a transmission to the registration server via the communications interface 404. The sent transmission may include a request to perform timer-based registrations on behalf of the access terminal 500. In at least some instances, the processing circuit 402 may also send the access terminal ID, which ID may be stored on the storage medium 406. However, in one or more other examples, the processing circuit 402 may communicate with the registration server without sending registration information such as the access terminal ID (e.g., IMSI, TMSI).

In one or more other examples, the processing circuit 402 may receive a transmission from the registration server via the communications interface 404. Such a received transmission may include a request for the access terminal 500 to allow the registration server to perform timer-based registrations on behalf of the access terminal 500. In response to such a request, the processing circuit 402 may generate and send a transmission via the communications interface 404 to the registration server to approve the request. In at least some instances, the processing circuit 402 may send the access terminal ID in the responsive transmission. However, in one or more other examples, the processing circuit may conduct these communications without sending the registration information such as the access terminal ID.

At step 604, the access terminal 500 may cease from conducting the timer-based registration with the network while the registration server is performing the timer-based registrations on behalf of the access terminal 500. For example, the processing circuit 402 executing the timer-based registration by registration server operations 502 may stop conducting timer-based registrations with the network so long as the registration server continues to perform such timer-based registrations on its behalf. In some instances, the processing circuit 402 may communicate with the registration server at periodic intervals to ensure that the registration server continues to perform the timer-based registrations on behalf of the access terminal 500.

At step 606, the access terminal 500 may power down to preserve battery power until event data is available for transmission and/or reception. That is, until data other than timer-based registration data is ready to be sent from the access terminal 500 or received by the access terminal 500. For example, the processing circuit 402 may power down all or a portion of the access terminal 500 (e.g., a portion of the communications interface 404) until event data is available for transmission and/or reception. In at least some examples, the processing circuit 402 may enter a conventional idle or sleep mode to conserve power, while abstaining from performing timer-based registrations.

Figure 7:
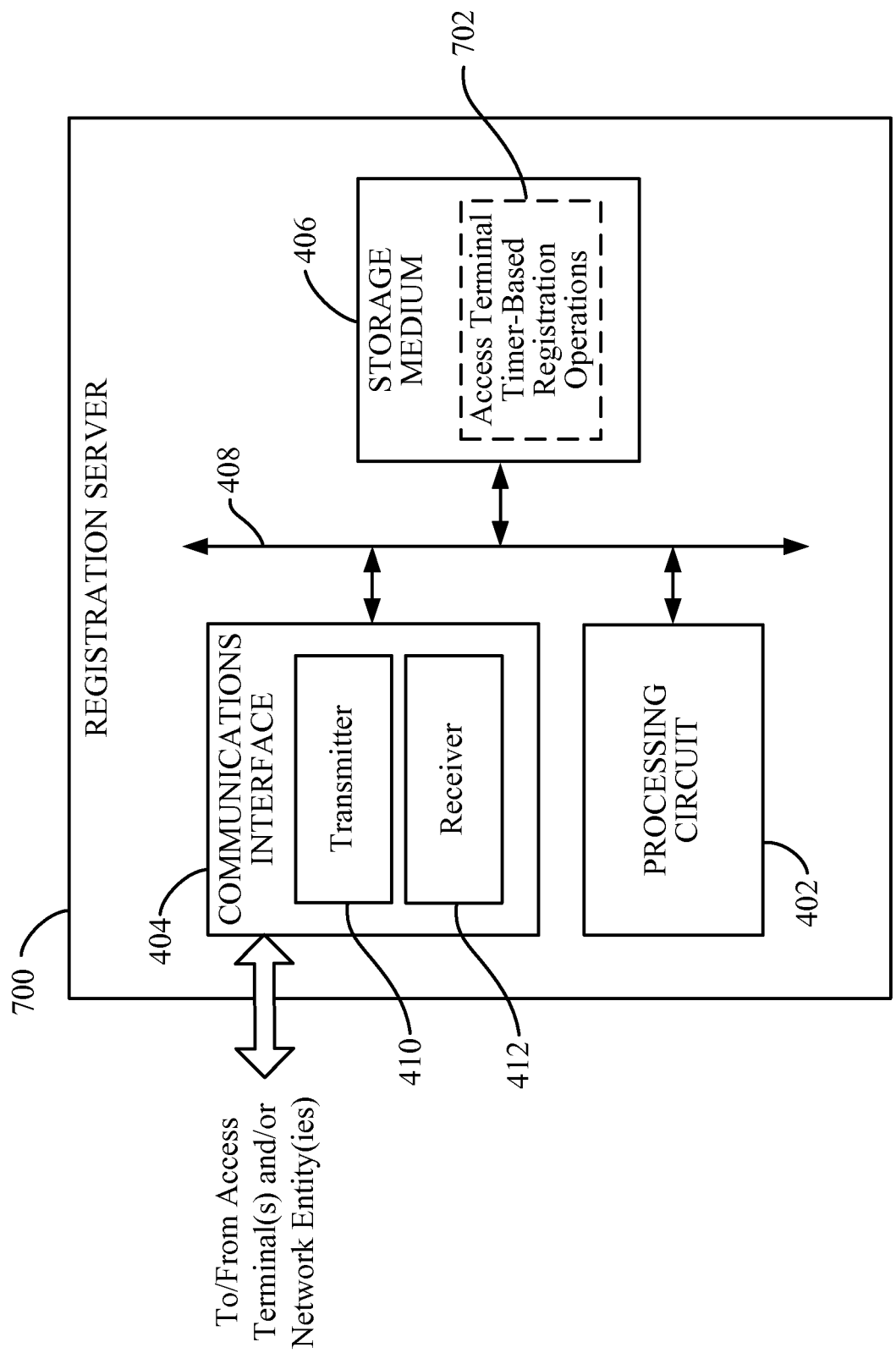
FIG. 7 is a block diagram illustrating select components of a processing system implemented as a registration server according to at least one example of the present invention.

Turning to FIG. 7, a block diagram is shown illustrating select components of a processing system implemented as a registration server 700, such as an M2M server, according to at least one example. The registration server 700 includes the processing circuit 402 coupled to the communications interface 404 and to the storage medium 406. In this example, the processing circuit 402 is adapted to perform any or all of the processes, functions, steps and/or routines related to one or more of the registration server (e.g., M2M server 220) described herein. Accordingly, the storage medium 406 may include access terminal timer-based registration operations 702 for performing registration on behalf of one or more access terminals, such as the access terminal 500. Such operations may cause the processing circuit 402 to communicate with an access terminal to enable the registration server 700 to perform registration on behalf of the access terminal, to obtain an identity (ID) associated with the access terminal, and to periodically communicate with a network entity to complete timer-based registrations on behalf of the access terminal.

Figure 8:
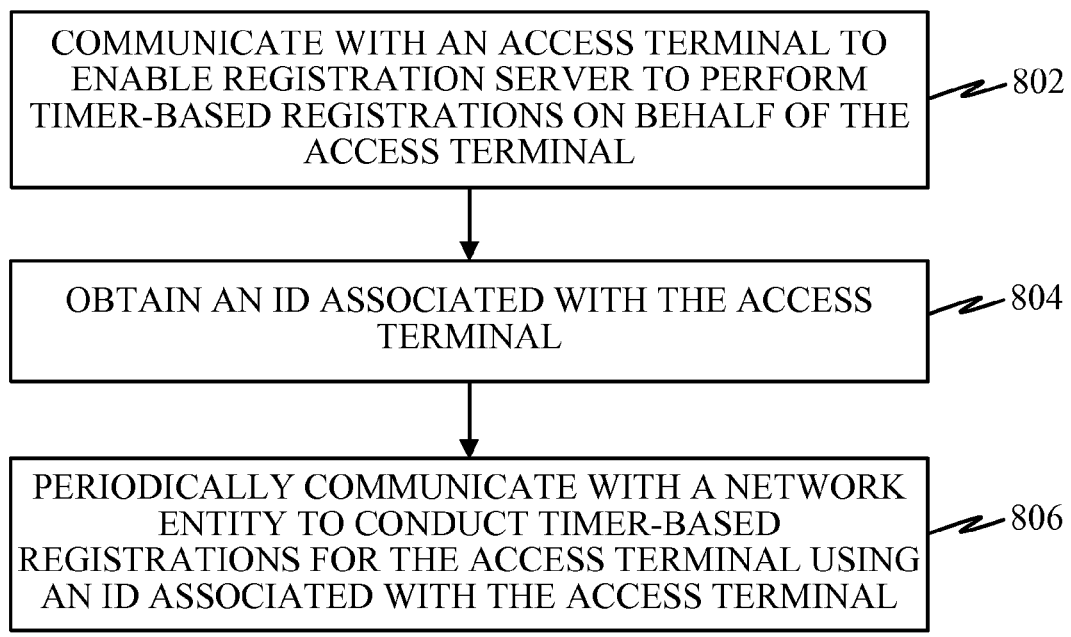
FIG. 8 is a flow diagram illustrating a method operational on a registration server according to at least one example of the present invention.

FIG. 8 is a flow diagram illustrating a method operational on a registration server, such as the registration server 700. Referring to FIGS. 7 and 8, the registration server 700 may communicate with an access terminal to enable the registration server 700 to perform timer-based registration on behalf of the access terminal at step 802. For example, the processing circuit 402 executing the access terminal timer-based registration operations 702 may communicate via the communications interface 404 with an access terminal. In at least one example, such communications may include the processing circuit 402 receiving via the communications interface 404 a transmission from the access terminal requesting that the registration server 700 perform timer-based registrations on behalf of the access terminal. In response to receiving such a transmission, the processing circuit 402 may add the access terminal to a timer-based registration list, indicating the access terminal as a device for which the registration server 700 will perform timer-based registrations during each timer-based registration period identified by the network.

In one or more other examples, the communications of step 802 may include the processing circuit 402 sending via the communications interface 404 a transmission to the access terminal requesting the access terminal to allow the registration server to perform timer-based registrations on behalf of the access terminal. In response to sending such a transmission, the processing circuit 402 may receive via the communications interface 404 a response from the access terminal granting such a request. Upon receipt of the response, the processing circuit 402 may add the access terminal to a timer-based registration list, indicating the access terminal as a device for which the registration server 700 will perform timer-based registrations during each timer-based registration period identified by the network.

At step 804, the registration server 700 can obtain an identity (ID) associated with the access terminal For example, the processing circuit 402 executing the access terminal timer-based registration operations 702 may obtain the access terminal ID (e.g., IMSI, TMSI). In some instances, the processing circuit 402 may obtain the ID from the access terminal itself as part of, for example, the communication at step 802. In other instances, the processing circuit 402 may obtain the access terminal ID from the network, such as from a network entity like the MSC/VLR, so that the access terminal ID is not communicated over a communication link between the registration server 700 and the access terminal. Additionally, the processing circuit 402 executing the access terminal timer-based registration operations 702 may obtain other information, such as whether the access terminal is stationary, the frequency of expected data exchanges with the access terminal, etc. Such information may be obtained in addition to or separate from the access terminal ID. The obtained access terminal ID may be stored by the processing circuit 402 in the storage medium 406.

At step 806, the registration server 700 may periodically communicate with a network entity to conduct timer-based registrations for the access terminal using the ID associated with the access terminal. For example, the processing circuit 402 executing the access terminal timer-based registration operations 702 can communicate with a network entity (e.g., an MSC/VLR) via the communications interface 404 to conduct timer-based registrations for the access terminal. In this manner, the timer-based registrations can be conducted without active participation by the access terminal in each registration. Such communications may include the processing circuit 402 transmitting a timer-based registration message via the communications interface 404 to the network entity on behalf of the access terminal.

Figure 9:
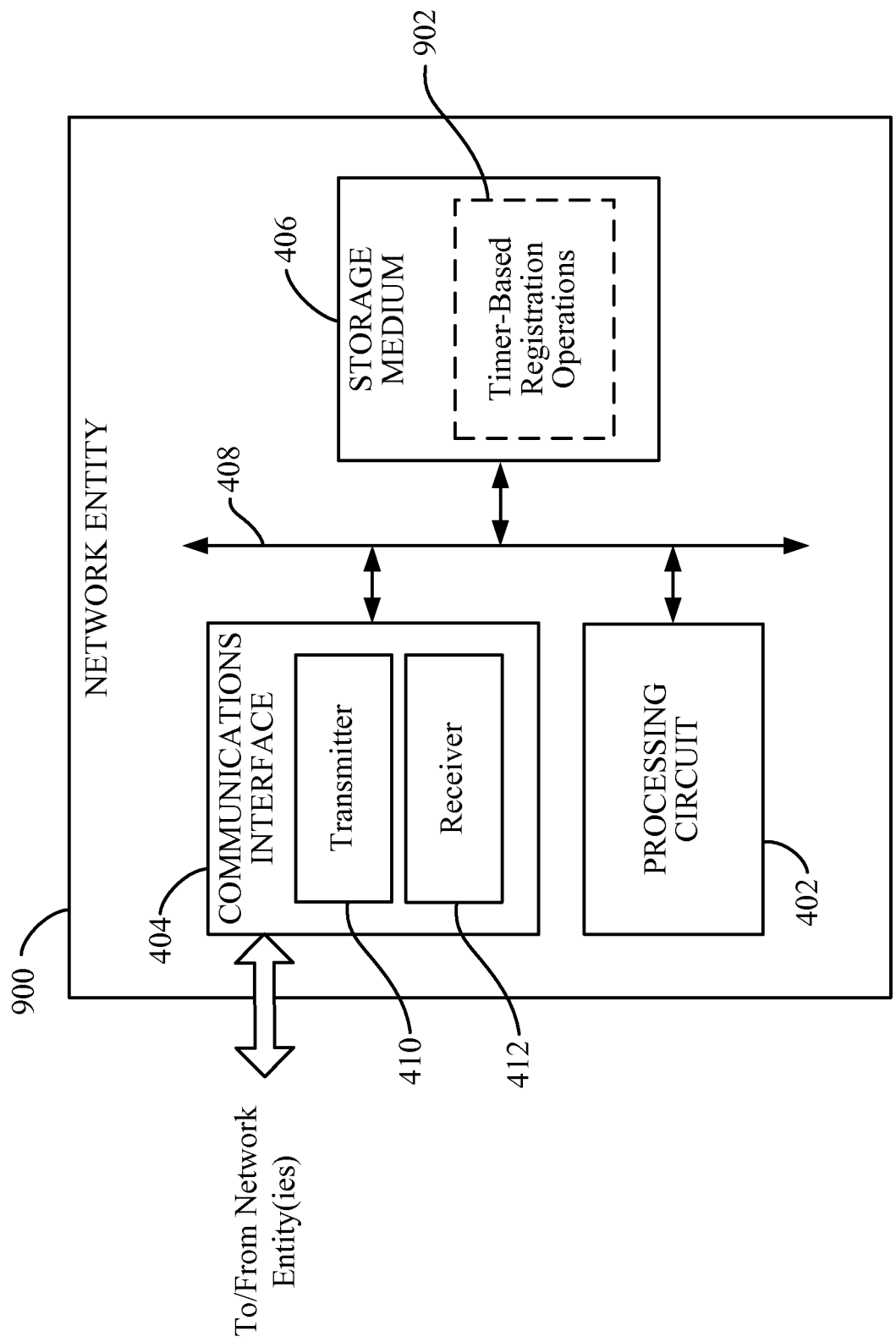
FIG. 9 is a block diagram illustrating select components of a processing system implemented as a network entity according to at least one example of the present invention.

FIG. 9 is a block diagram illustrating select components of a processing system implemented as a network entity 900, such as a MSC/VLR, according to at least one example. The network entity 900 includes the processing circuit 402 coupled to the communications interface 404 and to the storage medium 406. In this example, the processing circuit 402 is adapted to perform any or all of the processes, functions, steps and/or routines related to one or more of the network entities (e.g., MSC/VLR 208) described herein other than a registration server. In other words, the network entity 900 may represent a network entity different from the registration servers described herein. Accordingly, the storage medium 406 may include timer-based registration operations 902 for registering an access terminal based on registration information received from a registration server, such as an M2M server, instead of from the access terminal. Such operations may cause the processing circuit 402 to receive timer-based registration information from a registration server, which timer-based registration information is adapted for registering an access terminal. The timer-based registration operations 902 may further cause the processing circuit 402 to register the access terminal based on the registration information received from the registration server.

Figure 10:
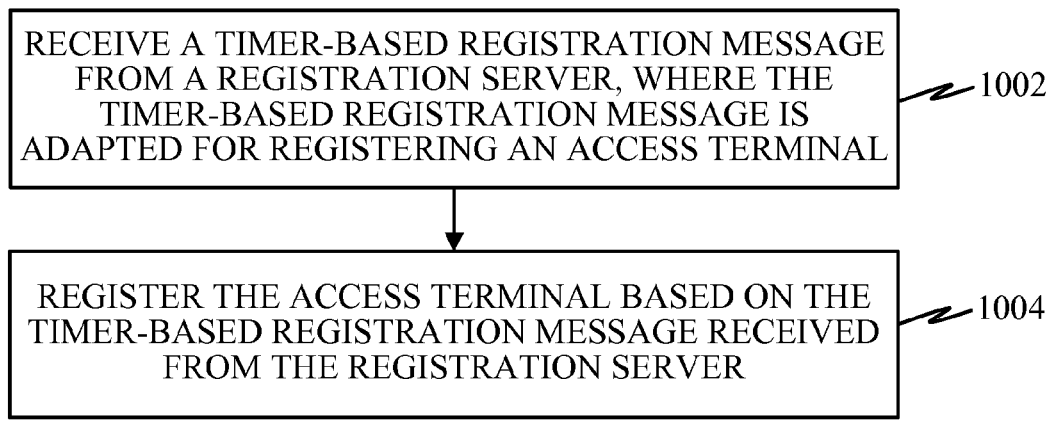
FIG. 10 is a flow diagram illustrating a method operational on a network entity according to at least one example of the present invention.

FIG. 10 is a flow diagram illustrating at least one example of a method operational on a network entity, such as the network entity 900. Referring to FIGS. 9 and 10, a network entity 900 may receive, at step 1002, a timer-based registration message from a registration server, where the timer-based registration message is adapted for registering an access terminal. For example, the processing circuit 402 executing the timer-based registration operations 902 may receive via the communications interface 404 a timer-based registration message sent by a registration server. In at least some examples, the registration server may be a network entity itself, and the timer-based registration message would therefore be received from another network entity. The timer-based registration message may include an identity (ID) associated with the access terminal (e.g., IMSI, TMSI). In some instances, this ID may have been previously provided to the registration server from the network entity 900.

At step 1004, the network entity 900 registers the access terminal based on the timer-based registration message received from the registration server. For example, the processing circuit 402 executing the timer-based registration operations 902 may register the access terminal in response to the timer-based registration message from the registration server. Such registration may include adding or keeping the access terminal on a list of active access terminals with which the network can communicate. For instance, such a list may identify access terminals and their locations to which paging messages can be sent.

In accordance with one or more of the foregoing features, access terminals that are stationary or substantially stationary can conserve power when timer-based registrations are conducted by a registration server on behalf of the access terminal.

One or more of the components, steps, features and/or functions illustrated in FIGS. 1, 2, 3, 4, 5, 6, 7, 8, 9 and/or 10 may be rearranged and/or combined into a single component, step, feature or function or embodied in several components, steps, or functions. Additional elements, components, steps, and/or functions may also be added without departing from the invention. The apparatus, devices and/or components illustrated in FIGS. 1, 2, 4, 5, 7 and/or 9 may be configured to perform one or more of the methods, features, or steps described in FIGS. 3, 6, 8 and/or 10. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

We claim:

1. An access terminal, comprising:
   a communications interface;
   a storage medium; and
   a processing circuit coupled to the communications interface and the storage medium, the processing circuit adapted to:
   communicate with a registration server via the communications interface to enable the registration server to perform timer-based registrations on behalf of the access terminal using an identity (ID) associated with the access terminal;

stop performing timer-based registrations while the registration server performs the timer-based registrations on behalf of the access terminal; and power down until event data is available for transmission or reception.

2. The access terminal of claim 1, wherein the storage medium includes the identity (ID) associated with the access terminal.

3. The access terminal of claim 1, wherein the processing circuit is further adapted to send a transmission to the registration server requesting the registration server to perform the timer-based registrations on behalf of the access terminal.

4. The access terminal of claim 1, wherein the processing circuit is further adapted to receive a transmission from the registration server requesting the access terminal to allow the registration server to perform the timer-based registrations on behalf of the access terminal.

5. The access terminal of claim 1, wherein the processing circuit is further adapted to send the identity (ID) associated with the access terminal to the registration server via the communications interface.

6. The access terminal of claim 1, wherein the identity (ID) associated with the access terminal comprises an international mobile subscriber identity (IMSI) provisioned in the access terminal or a temporary mobile subscriber identity (TMSI) for the access terminal.

7. A method operational on an access terminal, comprising:
communicating with a registration server to enable the registration server to perform timer-based registrations on behalf of the access terminal using an identity (ID) associated with the access terminal;
ceasing from conducting timer-based registrations while the registration server is performing the timer-based registrations on behalf of the access terminal; and
powering down until event data is available for transmission or reception.

8. The method of claim 7, wherein communicating with the registration server comprises:
sending a transmission to the registration server requesting the registration server to perform the timer-based registrations on behalf of the access terminal.

9. The method of claim 7, wherein communicating with the registration server comprises:
receiving a transmission from the registration server requesting the access terminal to allow the registration server to perform the timer-based registrations on behalf of the access terminal.

10. The method of claim 7, wherein communicating with the registration server comprises:
sending the identity (ID) associated with the access terminal to the registration server.

11. The method of claim 7, wherein communicating with the registration server comprises:
communicating with the registration server without sending the identity (ID) associated with the access terminal to the registration server.

12. The method of claim 7, wherein communicating with the registration server comprises communicating with a registration server implemented as a network entity.

13. The method of claim 7, wherein communicating with the registration server to enable the registration server to perform the timer-based registrations on behalf of the access terminal using the identity (ID) associated with the access terminal comprises:
communicating with the registration server to enable the registration server to perform the timer-based registrations on behalf of the access terminal using an international mobile subscriber identity (IMSI) or a temporary mobile subscriber identity (TMSI) associated with the access terminal.

14. An access terminal, comprising:
means for communicating with a registration server to enable the registration server to perform timer-based registrations on behalf of the access terminal using an identity (ID) associated with the access terminal;
means for ceasing from conducting the timer-based registrations while the registration server is performing the timer-based registrations on behalf of the access terminal; and
means for powering down until event data is available for transmission or reception.

15. A processor-readable medium comprising programming operational on an access terminal for:
communicating with a registration server to enable the registration server to perform timer-based registrations on behalf of the access terminal using an identity (ID) associated with the access terminal;
ceasing from conducting the timer-based registrations while the registration server is performing the timer-based registrations on behalf of the access terminal; and
powering down until event data is available for transmission or reception.

16. An article of manufacture configured for wireless communication, comprising:
a processor configured to: communicate with a registration server to enable the registration server to perform timer-based registrations on behalf of the access terminal using an identity (ID);
the processor further configured to: stop performing timer-based registrations while the registration server performs the timer-based registrations on behalf of the access terminal and power down until event data is available for transmission or reception; and
at least one of a sensor or controller coupled to the processor configured to collect and/or analyze data.

* * * * *